(12) United States Patent
Weaver

(10) Patent No.: US 7,773,885 B2
(45) Date of Patent: Aug. 10, 2010

(54) THERMAL DRIFT COMPENSATION SYSTEM AND METHOD FOR OPTICAL NETWORKS

(75) Inventor: Thomas L Weaver, Webster, MO (US)

(73) Assignee: The Boeing Company, Chicago, IL (US)

( * ) Notice: Subject to any disclaimer, the term of this patent is extended or adjusted under 35 U.S.C. 154(b) by 1371 days.

(21) Appl. No.: 11/200,295

(22) Filed: Aug. 9, 2005

(65) Prior Publication Data
US 2007/0036554 A1 Feb. 15, 2007

(51) Int. Cl.
H04B 10/08 (2006.01)
H04B 10/00 (2006.01)
H04B 10/04 (2006.01)
H04J 14/02 (2006.01)

(52) U.S. Cl. .......................... 398/95; 398/33; 398/115; 398/196

(58) Field of Classification Search .................. 398/33, 398/94, 95, 115, 154, 196–198
See application file for complete search history.

(56) References Cited

U.S. PATENT DOCUMENTS

| | | | |
|---|---|---|---|
| 5,825,792 | A | 10/1998 | Villeneuve et al. |
| 5,838,470 | A | 11/1998 | Radehaus et al. |
| 6,548,806 | B1 | 4/2003 | Chung et al. |
| 6,961,128 | B2 | 7/2003 | Park |
| 6,917,455 | B2 * | 7/2005 | McBrien et al. ............. 359/238 |
| 7,068,950 | B2 * | 6/2006 | Sinsky ......................... 398/198 |
| 7,162,164 | B2 * | 1/2007 | Brown et al. ................. 398/183 |
| 2003/0016413 | A1 | 1/2003 | Carrick et al. |
| 2003/0063636 | A1 | 4/2003 | Sasaki |
| 2003/0072053 | A1 | 4/2003 | Weaver et al. |
| 2003/0152390 | A1 | 8/2003 | Stewart et al. |
| 2004/0196534 | A1 | 10/2004 | Obeda et al. |

FOREIGN PATENT DOCUMENTS

| | | | |
|---|---|---|---|
| EP | 1182807 A2 * | 2/2002 | |
| WO | WO 00 38283 | 6/2000 | |

OTHER PUBLICATIONS

Dermis, Thomas F.; Nalepka, Joseph P.; Thompson, Daniel B.; and Dawson, David E.; Article "Fly-by-Light: The Future of Flight Control Technology," undated.

* cited by examiner

*Primary Examiner*—Dalzid Singh
(74) *Attorney, Agent, or Firm*—Harness, Dickey & Pierce, P.L.C.

(57) ABSTRACT

A system and method for detecting and correcting for thermal shifting of the passbands of an input filter of an optical receiver relative to the passbands of an output of an optical device, such as an optical router, where the router and the receiver are operating at remote locations and at different operating temperatures that cause thermal drifting of the passbands. In one implementation RF signals are impressed on optical signals transmitted by a transmitter to the optical router. Different frequency RF signals are impressed on each of the optical signals and the receiver uses the detected RF frequencies to cancel portions of optical signals that have drifted into adjacent passbands at the optical receiver. In another implementation a mechanically adjustable filter is employed at the receiver which is used to achieve a needed degree of shifting of the receiver passbands to compensate for passband misalignment between the router and the receiver. In another implementation multiple receive channels are employed for each router passband. The various described implementations allow for detecting and correcting of thermal misalignment between the router and receiver passband without the need for controlling the temperature of the router.

16 Claims, 8 Drawing Sheets

THERMAL DRIFT COMPENSATION SYSTEM AND METHOD FOR OPTICAL NETWORKS

STATEMENT OF GOVERNMENT RIGHTS

This invention was made with Government support under Contract Number FA8650-04-C-3416 awarded by the U.S. Air Force. The U.S. Government has certain rights in this invention.

CROSS-REFERENCE TO RELATED APPLICATIONS

This application is related to concurrently filed U.S. application Ser. No. 11/200,290 and 11/200,294.

FIELD OF THE INVENTION

The present invention relates to the detection of thermal drift in optical devices, and more particularly to the detection, monitoring and correction for a thermal drift in optical devices employing a plurality of independent optical channels.

BACKGROUND OF THE INVENTION

Electromagnetic interference (EMI) has been a challenge of long standing with mobile platform, and particularly with aircraft electronic systems. The development of fly-by-wire control systems to reduce vehicle weight and volume increases the risk of EMI. The possible use of EMI weapons to disrupt electronic subsystems used on various forms of mobile platforms and, particularly on commercial and military aircraft, poses an additional consideration that will likely gain in importance with time.

The use of "fly-by-light" systems would eliminate the risk of EMI to various electronic systems used on mobile platforms. However, fly-by-light systems are difficult to build in a form that is both robust enough to operate in aerospace environments, and which have sufficient capability of dealing with the larger number of data and controls points in a vehicle control network implemented on a mobile platform, for example, an aircraft. Nevertheless, the use of optic technologies represents one potential way to reduce the volume and mass of the traditionally used integration and control networks implemented on mobile platforms.

A principal obstacle in implementing optics based control networks in aerospace applications has been the somewhat limited number of independent optical signals that can be transmitted per optical path (i.e., per optical fiber). Thus, a key consideration in making the use of an optical based control network practical in an aerospace application is the ability to increase the number of wavelength channels that can be implemented on each optic path. However, in aerospace applications, where various components being controlled by optical signals may be exposed to harsh environments and experience significant temperature changes, thermal drift of the wavelength bands associated with the optical channels of a given optical component must be addressed. If thermal drift could be readily compensated for, then the wavelength bands defining the independent optical channels could be placed closer together than what would be possible in a thermally uncompensated for system. This would allow a greater number of wavelength bands to be used in a given optical medium, for example, on a single optical fiber.

One approach to controlling thermal drift is employed in the telecommunications industry where presently up to 64 separate wavelength division multiplexing (WDM) channels can be put on a single optical fiber. Implementing this number of separate WDM channels requires very close control of the wavelengths that define each WDM channel. The telecommunication industry's approach to controlling thermal drift is to put all temperature sensitive devices on thermal control units which control the temperature of the devices to within about 0.1° C. Those devices are placed inside temperature control enclosures which control the temperature to within about 2.0° C. On land, the enclosures are placed in temperature control buildings. At sea, the disclosures are placed at ocean depths of known constant temperature. Obviously, this degree of temperature control is impossible and/or impractical to implement in aerospace applications. In aerospace applications, forcing large numbers of optical signals onto one fiber does not produce the overwhelming cost benefits that it does for telecommunication applications. Aerospace applications typically involve fewer signals to send, over shorter distances, and inside a vehicle. As a result, the cross complexity and mass that would be required to be added into a mobile platform, in the form of complex transmitters and receivers used to put large numbers of signals on single optical fibers, does not give aerospace applications the same cost savings that are present for telecommunication applications.

To the contrary, the requirements of aerospace applications can be met by an optical based signal in which relatively modest numbers (i.e., typically 20 or less) signals are placed on a single optical fiber. This would allow operating wavelengths to be spaced sufficiently far from each other and the wavelength bands of the various devices made sufficiently wide, such that the use of optical fibers becomes more practical in an aerospace application. Then, the temperatures of the optical devices being controlled on the mobile platform can be allowed to drift, since because of the larger spacing between bands, the signals cannot cross into each others' bands. Furthermore, if sufficiently large bandwidth channels are employed, then some signals will always pass through their designated channels, even when the bands (i.e., channels) on a transmitter and those of the other optical component receiving the optical signals, such as a router, do not accurately align.

The drawback with the above described approach is that even in a typical aerospace application in which the transmitter and receiver are located together, so that they are exposed to the same ambient temperature, the optical devices that they communicate with, such as optical routers, are typically located remotely from the receiver/transmitter. As a result, the remotely located optical routers are likely to be exposed to, and therefore operating at, different temperatures from the receiver/transmitter. In aerospace applications, this difference in temperature can be significant. The large temperature range that various, remotely located optical devices may be exposed to can cause large wavelength drifts in the input filters used with such devices. For an optical based system to work with large temperature drifts, the wavelength bands must be so wide and so widely spaced apart that only a very limited (i.e., insufficient) number of bands can be fit into a useable optical spectrum on a given optical fiber.

Thus, it would be highly desirable to provide some means for compensating for thermal drift in optical components, such as optical routers, employed on a mobile platform where the optical device can be expected to experience significantly different thermal environments from those being experienced by a transmitter/receiver that is also being carried on the mobile platform. Accurately determining the thermal drift of the wavelength bands of the optical device and compensating for the thermal drift, without the need to control the temperature of the optical device (i.e., allowing the temperature of the optical device to "float"), would allow a sufficiently large number of wavelength bands to be implemented on a given optical medium to make use of an optical based system more practical in aerospace and other applications.

SUMMARY OF THE INVENTION

The present invention is directed to a system and method for determining thermal drift in an optical device located remotely from an optical transceiver and experiencing different thermal conditions than the optical transceiver.

In one preferred form, the system involves using the optical transceiver to transmit a first pair of narrow band optical signals within a single, predetermined wavelength band to the optical device. The optical device receives a first pair of optical signals and generates a second pair of narrow band optical signals back to the transceiver over a suitable optical medium. If the wavelength bands of the input of the optical device have shifted due to thermal drift, at least one of the first pair of optical signals will be attenuated when it is received back at the transceiver. The degree of attenuation, as well as which one of the pair of optical signals is attenuated more than the other, can be used to determine the direction and magnitude of thermal drift of all of the wavelength bands at the remotely located optical device.

In another implementation of the present invention, the above-described detection of thermal drift of the wavelength bands at the optical device is corrected by the use of a thermal subsystem. The thermal subsystem controllably cools or heats the optical transceiver as needed to induce a controlled shift of the wavelength bands of the transmitter, representing the independent channels over which optical signals are transmitted from the transmitter of the optical transceiver. In this manner a controlled degree of thermal drift can be introduced into the operation of the transmitter of the optical transceiver such that the centers of the wavelength bands over which optical signals are transmitted from the transmitter effectively "track" the centers of the wavelength bands at the input filter of the optical device.

In another preferred embodiment of the present invention RF signals are impressed onto the optical signals transmitted from the transmitter to the optical device. The optical device then transmits the optical signals with the RF signals impressed thereon to an optical receiver. The use of RF signals impressed on the optical signals enables optical signals that have shifted into adjacent passbands, as a result of temperature differences between the optical device and the optical receiver, to be readily detected and cancelled at the receiver. Preferably, different frequencies are used for selected ones of the optical signals such that optical signals transmitted on adjacent passbands have different frequencies impressed on each.

In another alternative embodiment a filter media is used at an input of the receiver to shift the wavelength bands to which the receiver is sensitive to match the wavelengths of the optical signals being transmitted from the optical device to an optical receiver. The optical media, in one preferred form, may comprise a filter. The optical media may be physically moved so that its orientation relative to the input of the receiver, is altered to cause the needed degree of wavelength shifting. Alternatively, the filter media may be deformed, such as by stretching or compression, to achieve the needed degree of shifting of the optical signals being received at the input of the receiver.

In still another alternative preferred embodiment a greater plurality of receive channels for the optical receiver are implemented than the number of optical channels used for optical signals transmitted by the optical transmitter. The number of receive channels may comprise any multiple of transmitter channels. The receive channels are further arranged such that no bandwidth gaps (i.e., no "dead bands") are present between adjacent receive channels. The use of multiple receive channels for each transmit channel enables each optical signal to be strongly detected at the optical receiver and thus compensates for the reduction in magnitude of the received optical signals when the passbands of the optical device and the optical receiver are misaligned.

Compensating for the thermal drift in the wavelength bands of the optical device by introducing a controlled degree of wavelength band shifting at the optical transceiver allows the wavelength bands to be narrower and spaced more closely together. This allows a greater number of independent optical channels to be implemented on a given optical medium, such as on a given optical fiber, without the need to control the temperature of the remotely located optical device. The system and method of the present invention also allows an optical based control network to be implemented on a mobile platform which allows a reduction in cost, weight and volume of the components used to implement a control network on a mobile platform. In addition, the use of an optical based system eliminates the EMI issues that would otherwise need to be addressed and compensated for in various mobile platform implementations.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
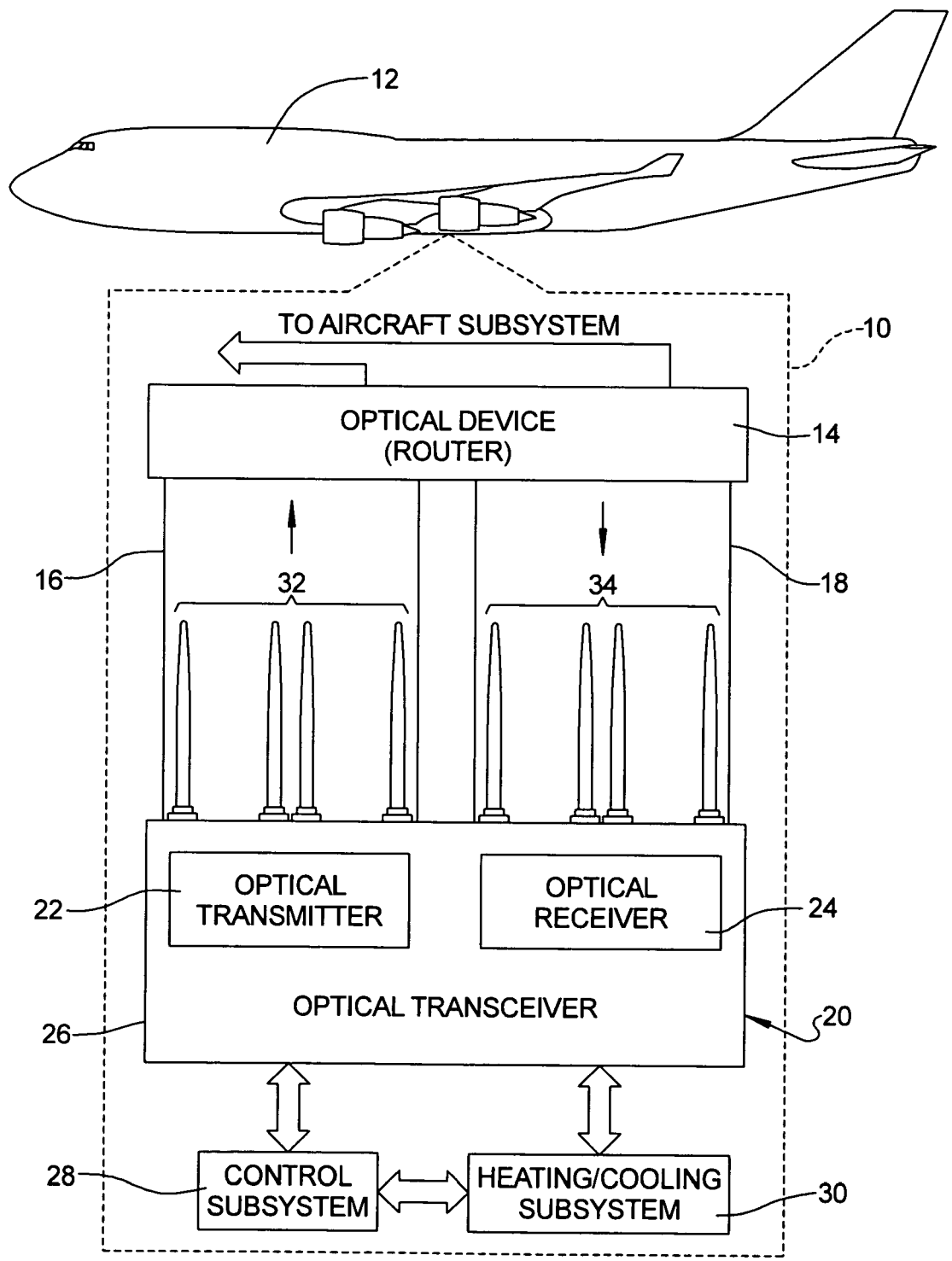
FIG. 1 is a simplified block diagram of a preferred embodiment of the system of the present invention.

Referring to FIG. 1, there is shown a system 10 in accordance with a preferred embodiment of the present invention. While the system 10 is shown as being implemented on aircraft 12, it will be appreciated that the system 10 could be implemented on any mobile platform where an optical control network is desired. The system 10 could also be employed in a fixed structure where an optical system is desired, and where an optical control device of the network is to be located in an ambient environment that causes the optical device to experience significant temperature changes that differ from those experienced by an optical transmitter.

The system 10, in this example, includes an optical device 14 in the form of an optical router coupled via a pair of optical fibers 16 and 18 with an optical transceiver 20. The optical transceiver 20 includes an optical transmitter 22 and an optical receiver 24 located within a common housing or enclosure 26. The optical transceiver 20 is in bidirectional communication with a control subsystem 28. The optical transceiver 20 is also in communication with a heating/cooling subsystem 30. The control subsystem 28 is further in bidirectional communication with the heating/cooling subsystem 30. The control subsystem 28 can be an independent subsystem as shown in FIG. 1 or it can be integrated into the transmitter 22.

While only two optical fibers 16 and 18 have been illustrated in FIG. 1, it will be appreciated that typically a larger number, for example, 4-8 optical fibers will be coupled between the optical transceiver 20 and the optical router 14. Also, while optical fibers 16 and 18 have been used for explanation purposes, other optical media such as free space, photonic bandgap fibers, or photonic crystals could be employed in lieu of optical fibers. Also, while an optical router will be used for purposes of explanation, it will be appreciated that the teachings of the present application could be used with any form of optical multiplexer, de-multiplexer, "add-drop", or other component where changing operating temperature of the device will cause thermal drifting of it optical channels.

With the present system 10, wavelength division multiplexing (WDM) is used to transmit a plurality of narrow band optical signals 32 over optical fibers 16 from the optical transmitter 22 to the optical router 14. The optical router 14 routes the signals as needed to various aircraft subsystems which are typically clustered together in groups, for example, groups of 12 to 16 components. This will be further explained in the following paragraphs.

The optical router 14 typically includes a filter having a plurality of wavelength bands which may also be termed "passbands". The optical device 14 receives each one of the optical signals 32 within a specific passband and returns an optical signal 34 over a corresponding passband to the optical receiver 24. Thus, each passband forms a separate optical channel. Due to the fact that the optical transceiver 20 is located in a different location in the mobile platform 12 than the optical router 14, the router 14 will often be experiencing a different ambient temperature than the optical transceiver 20. If the optical router 14 is warmer than the optical transceiver 20, than the router will shift all of its passbands in one direction, but if it is lower in temperature than the optical transceiver, than the optical router 14 will shift all of its passbands in the opposite direction. The control system 28 is used to monitor the received signals 34 and to shift the transmitted signals 32 so that the wavelength centers of each of the signals 32 match the centers of the passbands of the optical router 14. The control system 28 does this by controlling the heating/cooling subsystem 30 to either heat or cool the transmitter portion 22 of the optical transceiver 20 as needed to cause shifting of the optical signals 32 such that their wavelength centers remain centered within the passbands of the optical router 14. In this manner, the system 10 essentially forms a "closed loop" end system in which the received optical signals 34 are monitored and the temperature of the optical transceiver 20 is continuously controlled, in real time, via the heating/cooling subsystem 30. This enables the optical signals 32 to "track" the shifting passbands of the optical router 14.

Figure 2:
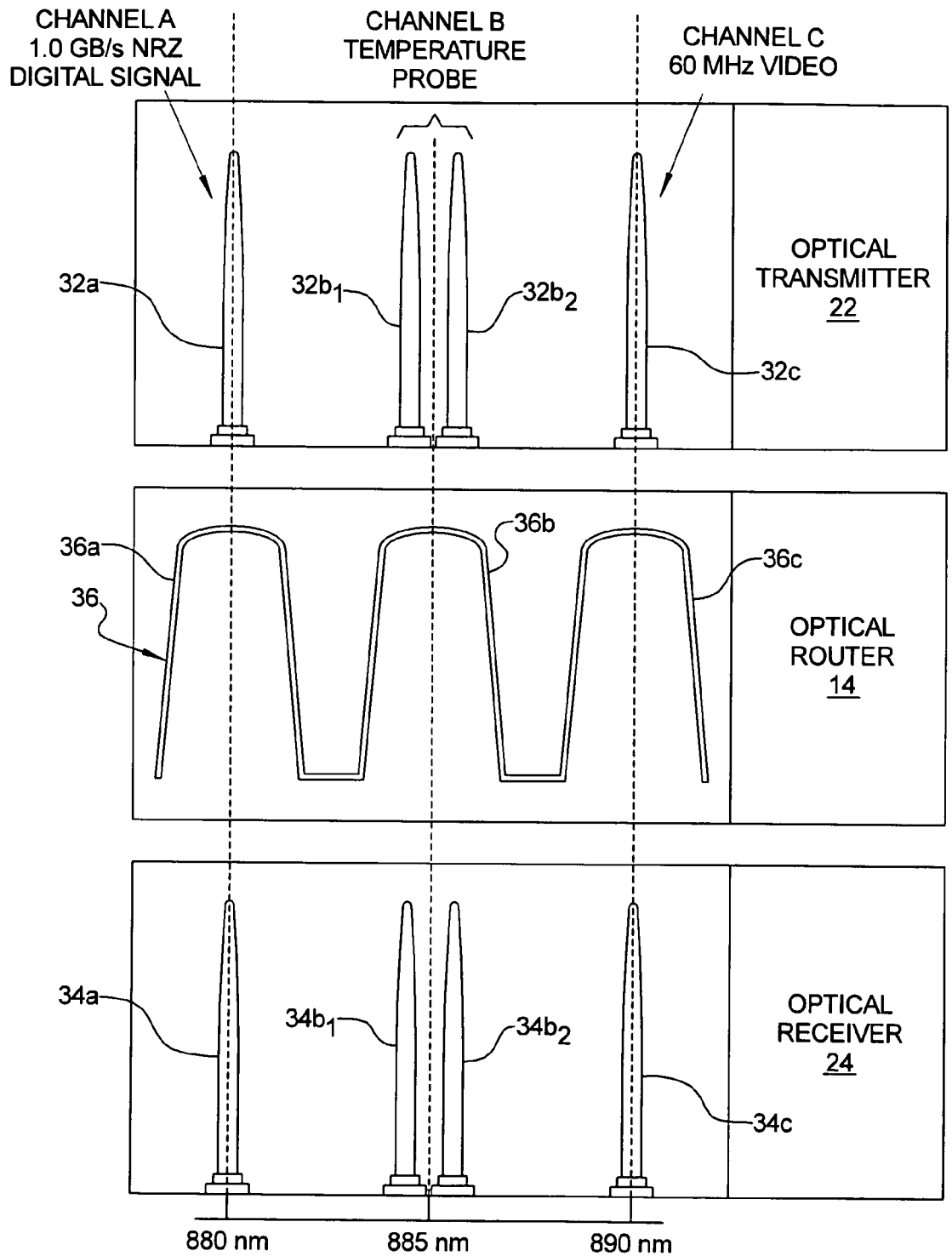
FIG. 2 is a diagram of signals being transmitted between an optical transmitter and an optical receiver via a remotely located optical router, illustrating alignment of the passbands of the router when the router is at the same temperature as the receiver and transmitter.

Referring now to FIG. 2, the operation of the system 10 will be further described in connection with a simplified diagram of the passbands 36 used by the optical router 14. In this diagram, the optical transmitter 22 and the optical receiver 24 are illustrated on opposite sides of the optical router 14 merely to aid in explaining the alignment of the optical signals 32 and 34 with the passbands 36. However, the transmitter 22 and receiver 24 are actually located together in housing 26, as shown in FIG. 1.

By way of background, it will be understood that a typical optical filter shifts its passband by about 0.026 nm per degree C. Over a 180° C. range from −55° C. to +125° C. range, the passbands of the router shift by about 4.7 nm. Without the thermal drift compensation of the present invention this large of a passband shift would require passbands that are about 8 nm wide and on 10.0 nm centers. However, 10 nm spacing of 8 nm bands means that 48 nm of wavelength are required to carry just four optical signals. But four signals (i.e., channels) per optical fiber is insufficient to be beneficial from a cost/benefit standpoint in aerospace applications. Furthermore, if these signals needed to be amplified, two separate amplifiers would be required because present day amplifiers have a useable gain bandwidth of only about 40 nm.

Temperature adjustment of the transmitter 22 is made practical by the fact that many lasers and tuned optical receivers have a wavelength drift with temperature of approximately 0.4 nm per degree C. This is much larger than the 0.026 nm per degree C. drift of the passband filters used in the optical router 14. This means that while the optical router 14 may experience temperature variations over a 180° C. range, which produce 4.7 nm wavelength shifts, the transceiver 20 can track the wavelength shifts by having its temperature adjusted over only a 4.7 nm/0.4 nm/° C.=11.75° C. range.

Thus, using the heating/cooling subsystem 30 to control the optical transceiver 20 over only an 11.75° C. range enables the wavelength centers of the optical signals to be shifted as needed to compensate for the much larger temperature variation that the optical router 14 experiences.

With further reference to FIG. 2, detecting the thermal drift of the passbands of the router 14 is accomplished by generating two narrow band optical signals as a "first" or "temperature probe" optical signal $32b_1$, $32b_2$. The first optical signal pair $32b_1$, $32b_2$ is centered within a passband 36b of the optical router 14, which can be viewed as "channel B". Optical signals 32a and 32c are transmitted in passbands 36a and 36c respectively (channels A and C). The passbands 36a-36c, in this example, are illustrated as having 4 nm wavelength bands positioned on 5 nm spacing. If the passbands 36a-36c of the router 14 have their centers aligned with the optical signals 32a-32c, then the magnitude of the signals 34a-34c transmitted back by the router 14, and received by the optical receiver 24, will each be approximately the same magnitude as their corresponding signals 32a-32c.

Figure 3:
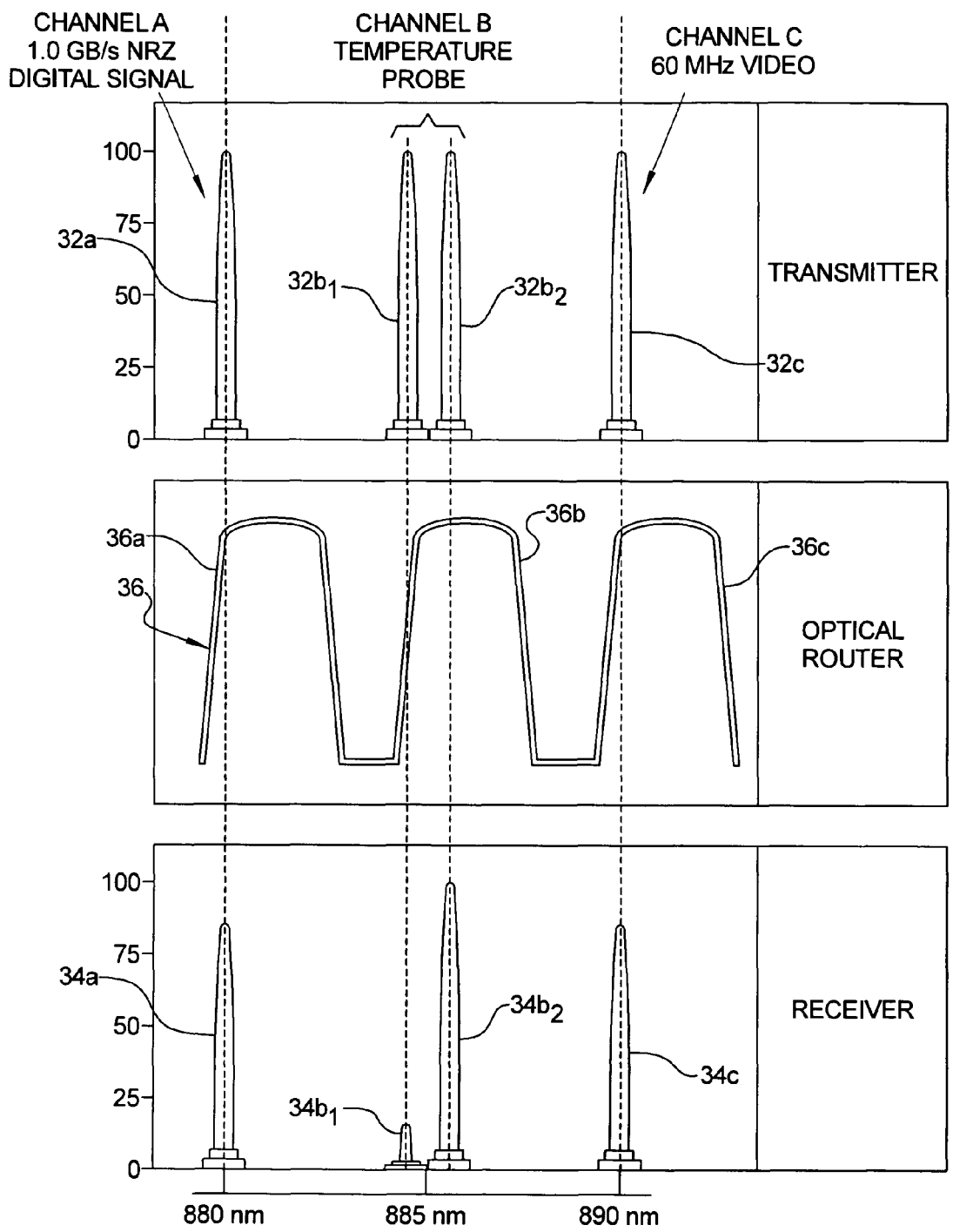
FIG. 3 is a diagram illustrating misalignment of the passbands of the optical router and the result of this misalignment on the optical signals being received at the receiver.

Referring to FIG. 3, if the passbands 36a have shifted because of the optical router 14 being at a different temperature from the optical transceiver 20, then the centers of the passbands 36a will be shifted from the wavelength centers of the optical signals 32a-32c. In this instance, one or the other of the first pair of optical signals $32b_1$ and $32b_2$ will be attenuated when it is received by the optical router 14. In this example, since the passbands 36a-36c have shifted upwardly in wavelength (downwardly in frequency), optical signal $32b_1$ will be attenuated significantly as compared to signal $32b_2$ because of being cutoff by the rolloff of passband 36b. This is due in part to the fact that the passbands 36a-36c do not have perfectly flat tops, but rather rounded tops. By using the pair of optical signals $32b_1$ and $32b_2$ and spacing these narrow band optical signals both within a 4 nm wavelength band, the attenuation of one or other can be detected. It will also be noted that signals 32a and 34c are also slightly reduced in intensity as a result of no longer being centered at the wavelength centers of the passbands 36a and 36c, respectively.

The control subsystem 28 monitors the second pair of signals $34b_1$ and $34b_2$ sent by the optical router 14 and from the degree of attenuation of one or the other of this pair of signals, as well as which one of the pair is attenuated, determines the degree of thermal shift of the passbands 36a-36c of the optical router 14. The control subsystem 28 causes the heating/cooling subsystem 30 to heat or cool the transmitter 22 as needed to apply a real time correction to the narrow band lasers used in the optical transmitter 22. The correction shifts the signals 32a-32c either higher or lower along the wavelength spectrum so that the centers of the optical signals 32a-32c are centered with the passbands 36a-36c of the optical router 14.

Thus, the system 10 does not attempt to control the temperature of the optical router 14, but instead focuses on controlling the temperature of the optical transmitter 22 in a manner that induces a controlled amount of thermal shifting of the signals 32a-32c from the transmitter as needed to match the thermal shifting of the passbands 36a-36c. This enables the received signals 34a-34c received by the optical receiver 24 to be maintained as strong in magnitude as possible.

The second significant benefit of this approach is that the passbands 36a-36c can each be made much narrower. This enables wavelength division multiplexing (WDM) of optical signals to be made practical for aerospace applications where devices needing separate wavelengths are usually clustered in groups (typically of 12 to 16). As one specific example, one motor in an aerospace electrical actuator may send 12 separate optical sensor signals to a flight control computer. Without the temperature compensation of the present invention, wavelength division multiplexing channels of an optical router would need to be spaced 10 nm apart and only 4 signals could be put into a single optical fiber. Consequently, 6 fibers (3 excitation fibers, where each carries 4 excitation signals to the sensors via the router, and 3 fibers bringing the modulated signals back via the router) would need to be used to excite and collect signals from the 12 sensors. However, if the passbands can be put on 3.3 nm centers, then one fiber may carry 12 signals and only 2 (1 fiber going out and one coming back) would be needed for actuator motor sensing in this example. Reducing the total optical fiber count becomes especially important at a flight control computer because if a vehicle has a dozen flight control surfaces there will typically be 12 actuators (one for each flight control surface). If each actuator has two motors and if there are 4 wavelengths in a fiber, there would need to be 144 fibers (12 actuators×2 motors per actuator×6 fibers per motor), just for sensing purposes alone, that will need connector space on the face of the flight control computer. With 12 wavelengths in a single fiber, there would only need to be 48 fibers connected to the face of the flight control computer.

The system and method 10 of the present invention thus allows the use of an optical network to be implemented on a mobile platform with significantly fewer optical fibers being required for a given implementation. The system and method 10 further eliminates concerns with EMI that would otherwise be present with fly-by-wire control systems. The system and method 10 further reduces the mass, complexity and cost of an optical control network by its ability to "squeeze" more optical channels onto a given optical fiber without the risk of performance degradation that would be otherwise incurred from the thermal drift experienced by the optical router 14.

Figure 4:
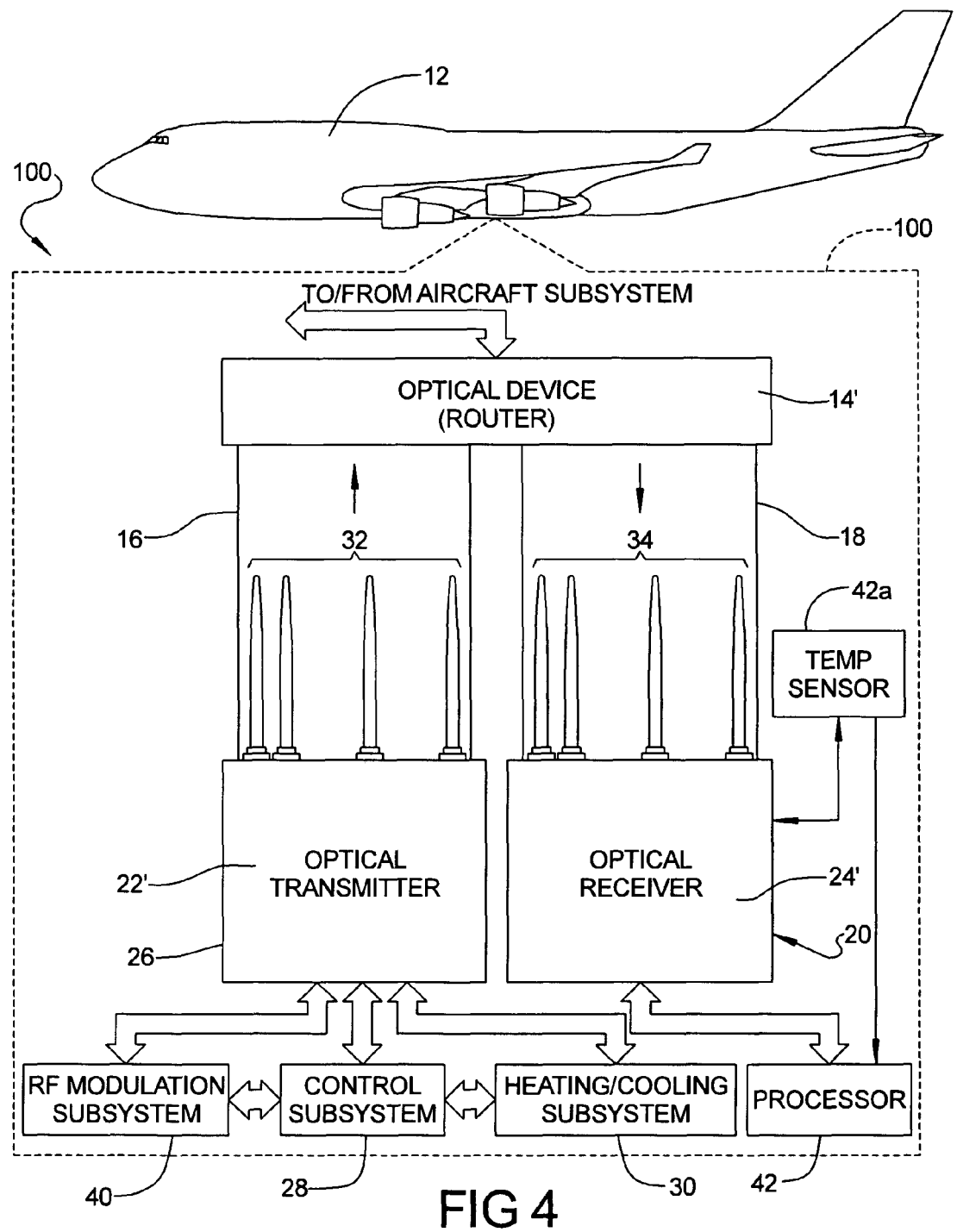
FIG. 4 is a simplified block diagram of an alternative preferred embodiment of the present invention incorporating a subsystem for modulating RF signals onto the optical signals transmitted from the transmitter to the optical router and a subsystem for detecting the RF modulated optical signals at the receiver.

Referring to FIG. 4, an alternative preferred implementation of the present invention is illustrated and designated by reference numeral 100. Components in common with system 10 have been labeled with corresponding reference numerals having a prime (') symbol. With the system 100, the optical transmitter 22' and the optical receiver 24' are no longer located within a common housing or enclosure, but are instead located remote from each other. In addition, the optical device 14' is located remotely from the optical transmitter 22' and the optical receiver 24'. Since the optical transmitter 22' and optical receiver 24' are not located in a common enclosure, they will not necessarily experience the same ambient temperature, and thus may not be at the same operating temperature. Thus, the passbands at the output of the optical device 14' may not be aligned with the passbands at the input of the optical receiver 24', and the passbands at the input of the optical receiver 24' will not necessarily track the wavelength centers of the transmitted signals from the optical transmitter 22'. In this instance the thermal drift of the optical receiver 24' cannot simply be controlled by heating/cooling it via the heating/cooling subsystem 30' because the optical transmitter 22' and the optical receiver 24' are located remotely from each other. Moreover, the optical receiver 24' may be located in an avionics bay or at some other area where it would be undesirable to attempt to heat the optical receiver 24'. Thus, an alternative system is needed for detecting when the optical device 14' is operating at a different temperature from the optical receiver 24', and thus introducing misalignment of the passbands at the output of the optical device 14' with the passbands of an input filter of the optical receiver 24'. This embodiment accomplishes detection of this router 14'/receiver 24' passband misalignment by impressing a unique (i.e., different) radio frequency (RF) modulation signal from an RF modulation subsystem 40 onto each of the optical signals 32a, 32b and 32c. A processor 42 is used in connection with the optical receiver 24' to detect when an RF modulated optical signal is being received in a passband that it should not be received in, thus indicating misalignment of the two passbands.

A variety of different types of signals can be readily impressed on the continuous wave outputs of the narrowband lasers used to form the optical signals 32. For example, sinusoidal excitation signals such as AM, FM and Phase Modulation (PM) could be employed. Digital signals could also be modulated onto the optical signals 32a-32c, and separated from each other by alternating them with analog signals. In either event, the RF modulations allow positive identification of each of the optical signals 32a-32c, even in the event that temperature-induced wavelength drift of the receiver 24' causes a signal from one channel of the router 14' to cross into an adjacent channel at the receiver 14' input.

Figure 5:
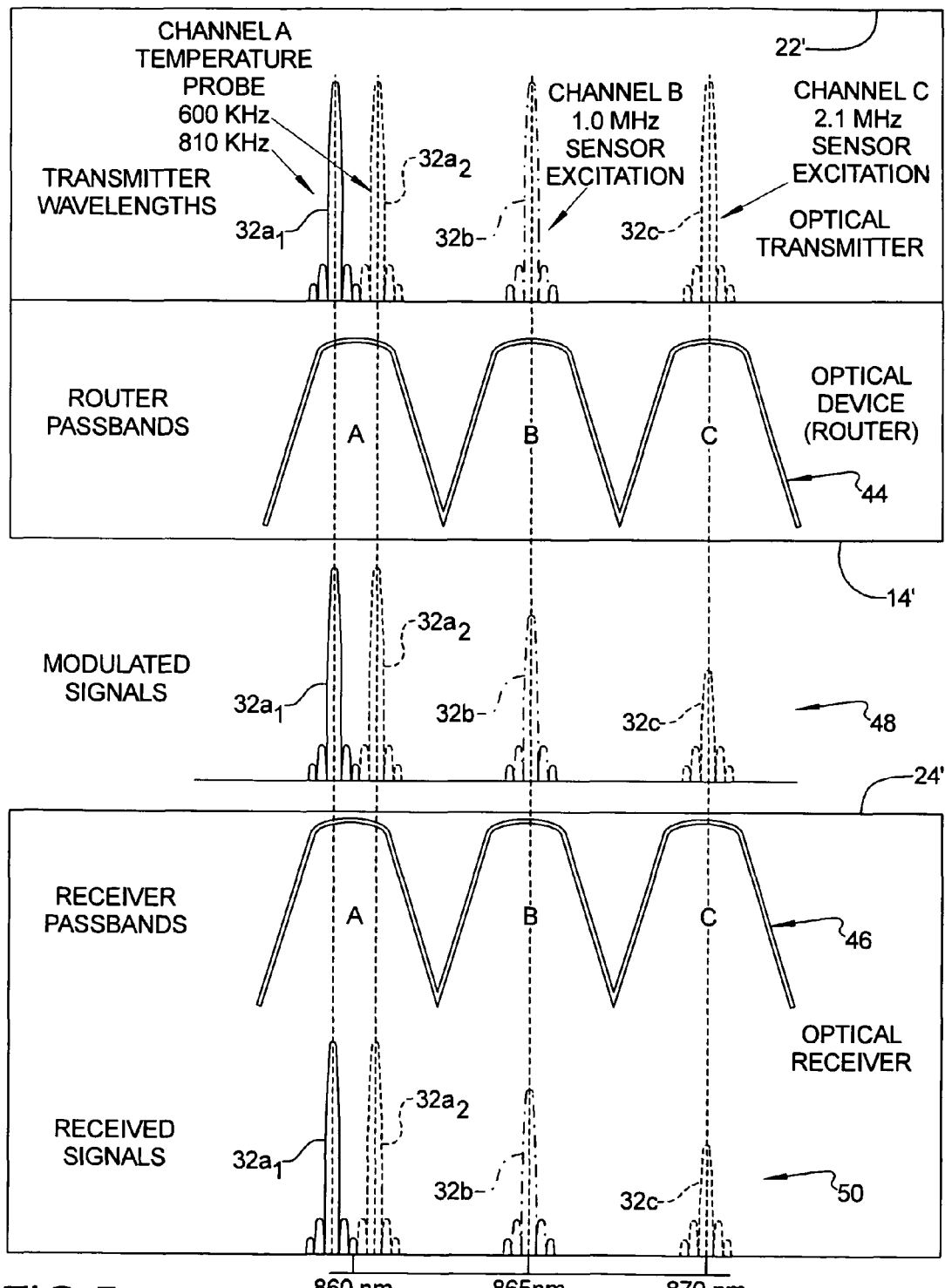
FIG. 5 is a waveform diagram of the optical signals having RF signals impressed thereon, and further illustrating when the passbands of the optical router are aligned with the passbands of the optical receiver.

Referring to FIG. 5, an example of the above-described modulation scheme is illustrated. An 810 KHz signal is impressed on optical signal $32a_1$. A 600 KHz signal is impressed on optical signal $32a_2$. A 1.0 MHz signal is impressed on optical signal $32b$, and a 2.1 MHz excitation signal is impressed on signal $32c$. For convenience, optical signals $32a_1$ and $32a_2$ can be viewed as being placed on channel "A". Optical signal $32b$ can be viewed as being placed on an optical channel "B", and optical signal $32c$ on channel "C". The passbands of the router 14' are designated by waveform 44. The passbands of the receiver 24' are designated by waveform 46. The specific frequencies above are merely exemplary and may be varied.

When the passbands 44 of the optical device 14' are aligned with the wavelength centers of the signals 32 generated by the transmitter 22', the modulated signals appear as indicated by reference numeral 48 in FIG. 5. The optical signals $32a$-$32c$ are centered within their respective passbands 44. Since the receiver 24 passbands 46 are aligned with the router passbands 44, the signals received by the optical receiver appear as indicated by reference numeral 50. The RF modulated optical signals $32a$-$32c$ remain centered within the receiver passbands 46 and are substantially of the same magnitudes as indicated by reference numeral 48. It will be noted, however, that the RF modulated optical signals $32a$-$32c$, as indicated by reference numeral 48, are reduced slightly in magnitude, as compared to the signals $32a$-$32c$ output by the transmitter 22'.

Figure 6:
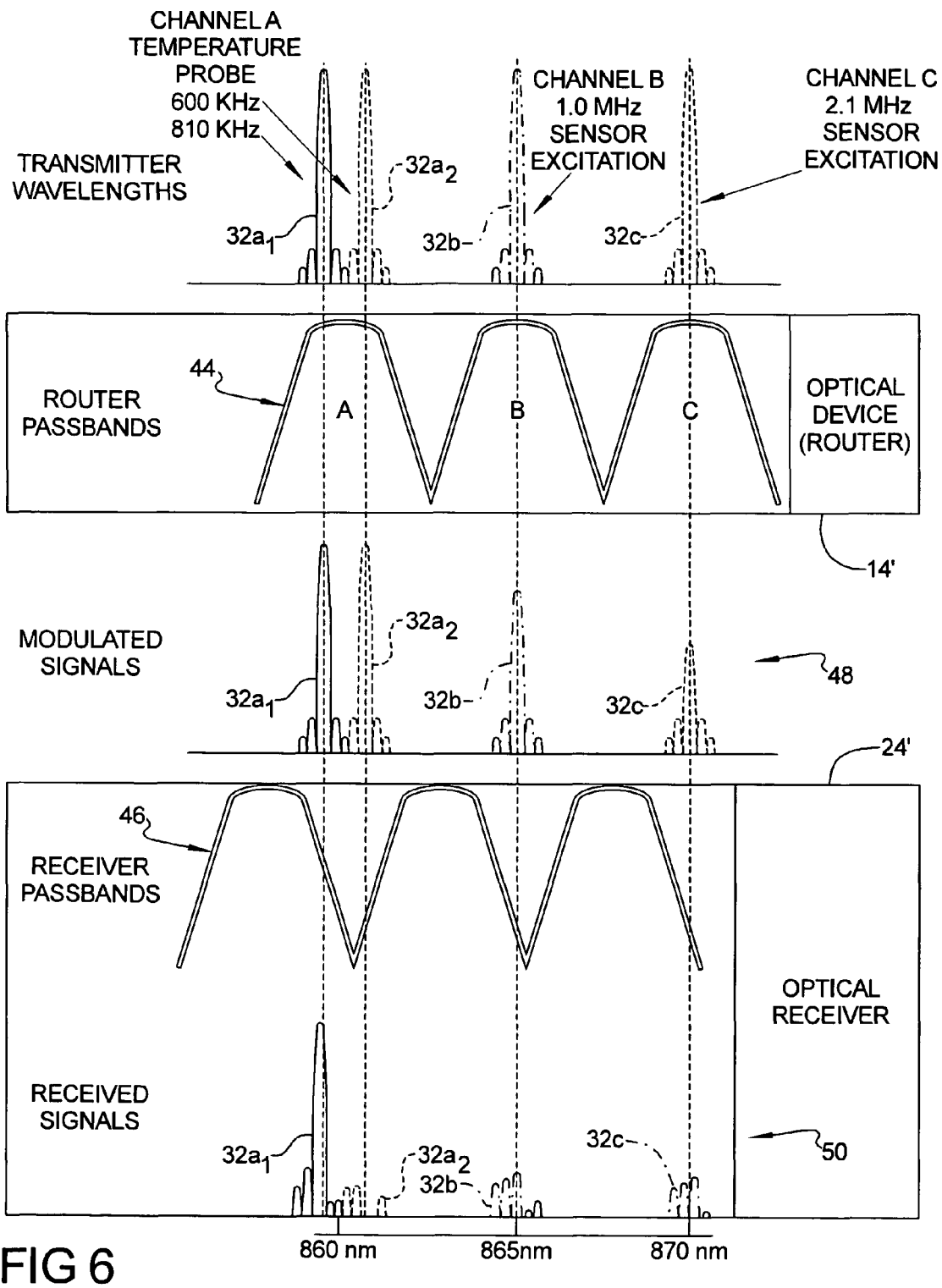
FIG. 6 is a graph illustrating the effect on the optical signals when the optical receiver passbands are misaligned with the optical router passbands.

Referring now to FIG. 6, the effect on the RF modulated optical signals $32a$-$32c$ can be seen when the router passbands 44 do not align with the passbands 46 of the optical receiver 24'. The RF modulated output signals $32a$-$32c$, as indicated by reference numeral 48, are still aligned with the router passbands 44. However, due to the shift of the receiver passbands 46, the RF modulated optical signals $32a$-$32c$ now have drifted or "bled" into adjacent channels. Specifically, a portion of signal $32a_2$ has now drifted into channel B, and a portion of signal $32b$ has drifted into channel C. In this example, the optical receiver 24' may be located in an avionics bay, near the transmitter 22', and will therefore not be as hot as the filters in the optical router 14', which are located in a considerably warmer, remote location of the mobile platform 12.

Modulating RF signals of different frequencies onto the optical signals $32a$-$32c$ allows the processor 42 (FIG. 4) to detect when an unwanted signal is present within a given optical channel and to cancel (i.e., reject) that portion of the signal within a given channel. Thus, processor 42 rejects that portion of optical signal $32a_2$ that is present within channel B in FIG. 6. Similarly, the processor 42 rejects that portion of optical signal $32b$ that is present within channel C.

Figure 7:
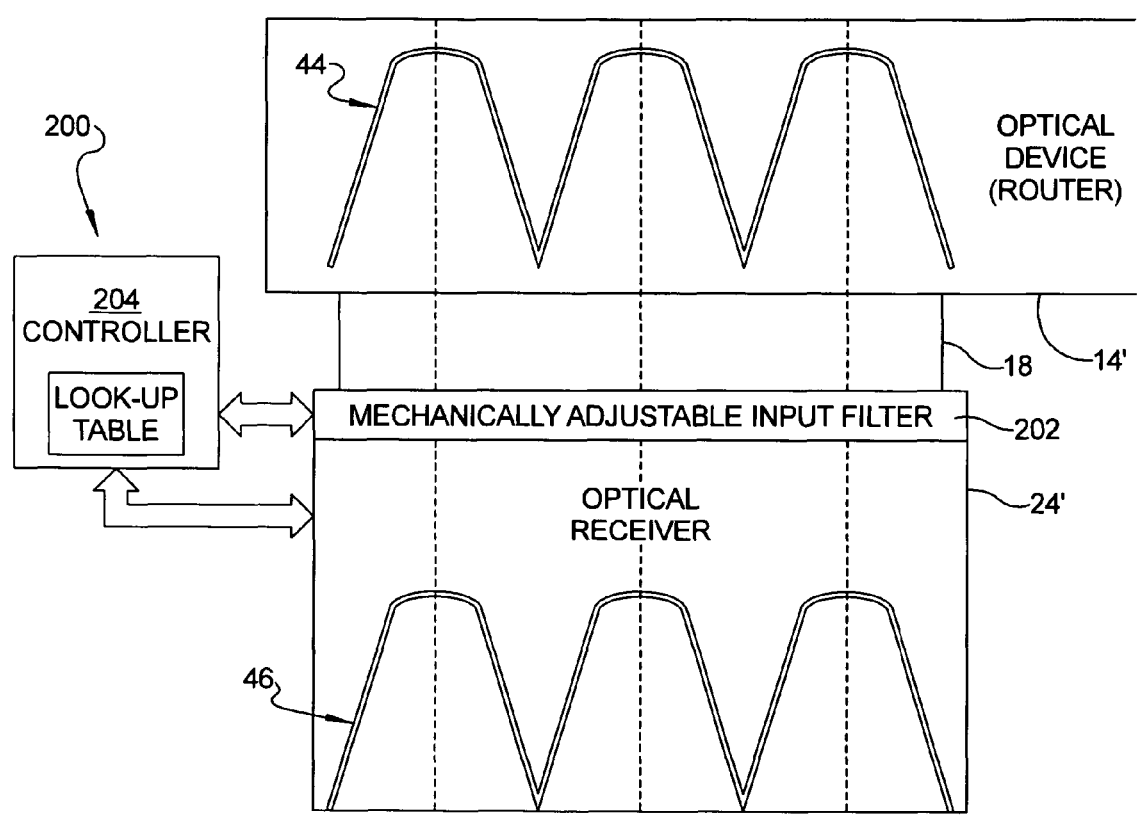
FIG. 7 is yet another alternative preferred embodiment of the present invention incorporating a filter positioned at an input of the optical receiver for controllably shifting the wavelength bands of the optical signals being received by the receiver to compensate for thermal drifting of the passbands of the optical router.

Since the signals received by the optical receiver 24' in FIG. 6 have also been attenuated significantly, the receiver 24' also makes a magnitude compensation to the received signals designated by reference numeral 50 in FIG. 6. One way of achieving this compensation is by directly measuring a temperature of the optical receiver 14' using a suitable temperature sensor 42a in communication with the processor 42. If the characteristics of the filter of the optical receiver 24' are known, then the difference in temperature between the optical router 14' and the optical receiver 24' can be determined. A suitable look-up table can be used which includes magnitude correction values dependent upon the temperature to correct for the signal attenuation caused by the mismatch of the receiver passbands Referring to FIG. 7, another alternative preferred embodiment of the present invention is illustrated and represented by reference numeral 200. This approach does not make use of impressing RF modulation signals onto the optical signals $32a$-$32c$ as described in connection with FIGS. 4-6, but instead uses a mechanically adjustable input filter 202 to shift the passbands 46 at an input side of the optical receiver 24'. The mechanically adjustable input filter 202 is controlled by a controller 204 that monitors operation of the optical receiver 24', and more particularly its temperature, and uses the temperature information to apply suitable control signals to alter the mechanically adjustable input filter 202 as needed to achieve the needed degree of passband 46 shifting. The mechanically adjustable input filter 202 may comprise devices as diverse as Bragg gratings, Fabry-Perot etalons, Surface Acoustic Wave devices, and Micro-Electro-Mechanical Machine gratings. The mechanically adjustable input filter 202 may be physically altered in position relative to the optical receiver 24' to achieve the needed degree of shifting of the passbands 46. Alternatively, it may be physically deformed such as by mechanical stretching or compression, which also will cause the needed shifting of the passbands 46. In this implementation the controller 204 also makes use of a look-up table which includes information correlating the temperatures of the optical transmitter and receiver 24', and the transmission characteristics of the filters in the optical device 14' and the receiver. With that information, it is possible for the controller to determine the wavelength shift of the device 14' and alter the emission wavelengths of the transmitter and the passbands of the receiver 24' to center each signal in each passband of the optical device 14'.

Figure 8:
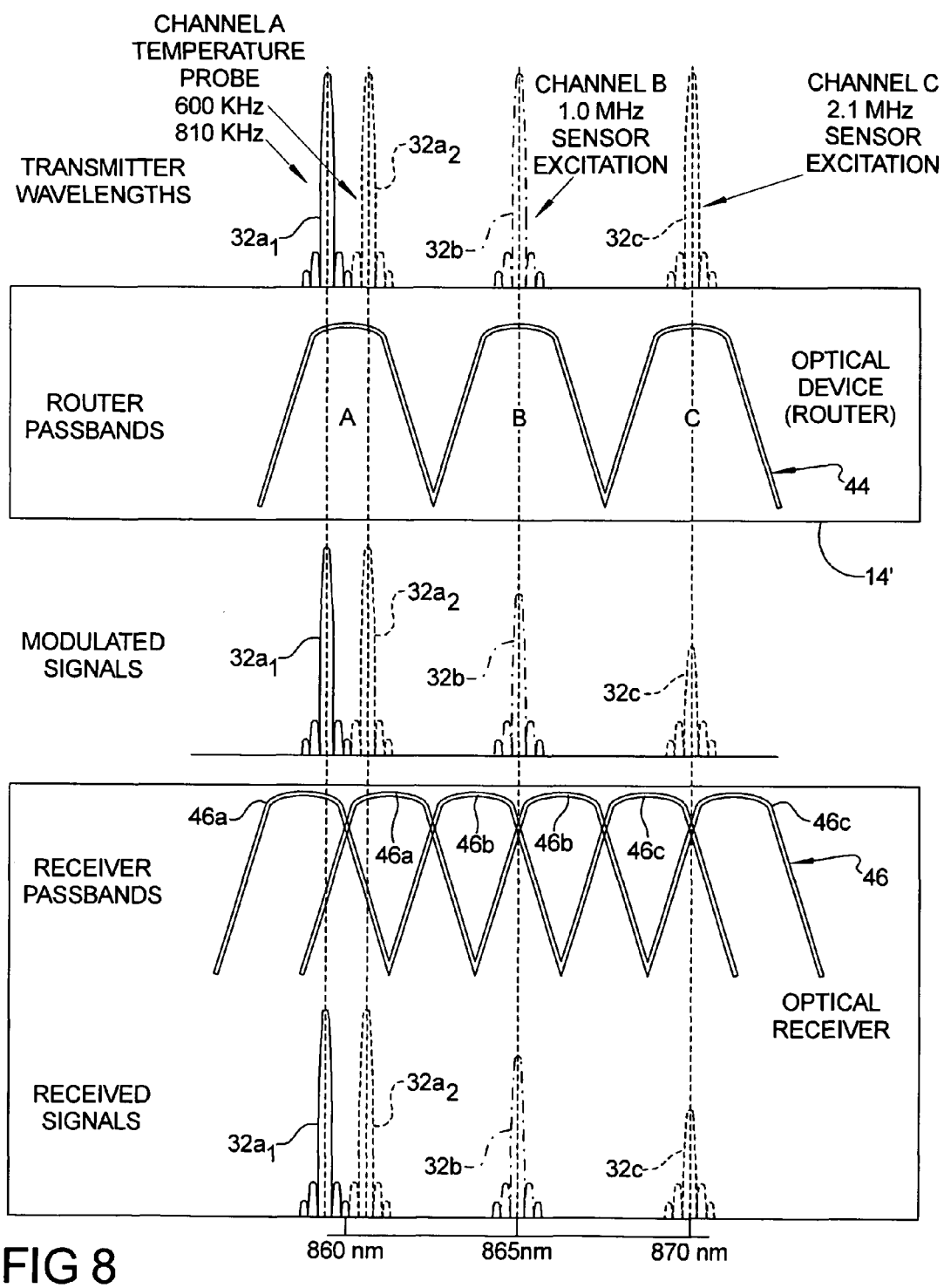
FIG. 8 is a graph illustrating yet another alternative preferred implementation of the present invention in which a greater number of receive channels than transmit channels are used for receiving the optical signals at the optical receiver.

Referring to FIG. 8, an alternative implementation of the system 100 described in connection with FIGS. 4-6 will now be described that involves the use of a greater number of receive passbands (i.e., channels) 46 than router passbands 44. In this example, there are two receive passbands $46a$ assigned for channel A, two passbands $46b$ assigned for channel B and two passbands $46c$ assigned for channel C. Thus, there are two receive passbands for each one of the router passbands (i.e., channels) 44. The use of multiple receive channels for each channel of the optical router 14' is beneficial because of the signal attenuation that occurs when the receive passbands 46 are misaligned with the router passbands 44. The optical receiver 24' still needs to make sense of the signals present within each of the passbands 46. However, instead of using analytic compensation as described in connection with the system 100 of FIGS. 4-6, the use of multiple receive channels for each passband of the router 14' allows the signals 32 present within each passband of the optical router 14' to be strongly detected by the optical receiver 24'. This approach also avoids the need to change the gain of the receive amplifiers used within the optical receiver 24', which would otherwise be needed to compensate for the weak optical signals $32a$-$32c$ received by the optical receiver 24', but at the cost of increased noise in the receiver 24'. Since there are no "deadbands" or "gaps" between the receiver passbands 46 where a signal (or portion of a signal) may be lost, the signals $32a$-$32c$ can be detected more readily. While two receive channels are shown for each router passband, it will be appreciated that any multiple of receive channels could be employed. Thus, three, four or more receive passbands per router passband could be employed. From a practical standpoint, however, the maximum number of receive passbands that may be employed per router passband will depend largely on the bandwidth of each router passband.

With the multiple receive channel approach described in FIG. 8, the temperature of the transmitter 22' is still controlled as described in connection with the system of FIG. 4, however, no shifting of the passbands 46 of the receiver 24' is employed. When using multiple receive channels, however, the temperature of the optical router 14' will be sensed in two ways. The first is to compare the ratio of the two signals that appears in only the first passband (channel A). This is the method identified previously. In practice, it is only reliable if the drift of the passband with respect to the two signals is so small that though one signal is in the roll-off region of the passband, and so is smaller than the signal near the center of the passband, the smaller signal is still fairly strong, such as greater than 50% of the strength of the strong signal. If the drift of the passbands is such that one signal is near the extreme edge of the passband, its strength at the detector in the receiver may be close to the noise level of the detection system. That means that the strength of the weak signal is more uncertain than the strength of the strong signal. Dividing the uncertain, weak signal by the certain, strong signal to obtain the ratio, and hence, the temperature, gives a value with the uncertainty of the weak signal. The second approach makes use of the large number of passbands of the present receiver 24'. It is useful for the case when drift of the passbands is large. In that case, rather than use the very weak signal that is passed by the filter in the first passband, it is better to use the stronger version of the same signal that is passed by the filter in the adjacent passband. Thus to obtain an accurate temperature for the router 14' if its temperature-induced drift is small, the ratio of the two optical signals $32a_1$ and $32b_1$ appearing in the first passband (channel A) is used, but for large drifts, the strength of the signal $32a_1$ in the first passband (channel A) is compared with the strength of the signal $32a_2$ in the second (adjacent) passband (channel B).

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for detecting optical channel bandwidth misalignment between output channels of a first optical device and input channels of a second optical device, comprising:
    a system for generating optical signals each having a predetermined optical bandwidth to be transmitted to said first optical device;
    a system for impressing a radio frequency (RF) signal component on selected ones of said optical signals;
    a detection subsystem for detecting said RF signal components on said optical signals as said optical signals are transmitted from said first optical device to said second optical device and using said RF signal components to determine if said output channels and said input channels are misaligned.

2. The system of claim 1, wherein said detection subsystem detects said channel misalignment by detecting if at least a portion of one of said selected optical signals is present on a channel that said one selected optical signal is not assigned to.

3. The system of claim 1, wherein said system for impressing RF signals onto said optical signals operates to impress RF signal components having different frequencies onto said optical signals.

4. The system of claim 1, wherein said system for impressing RF signal components onto said optical signals operates to impress at least a pair of different types of RF signals onto said optical signals.

5. The system of claim 4, wherein said system for impressing RF signal components comprises selectively impressing digital signals and analog signals onto said optical signals.

6. The system of claim 1, wherein said second optical device comprises an optical receiver.

7. The method of claim 1, wherein said second optical device comprises a plurality of input channels that is a multiple of said output channels of said first optical device, and such that each said output channel of said first optical device is associated with more than one said input channel of said second optical device.

8. A method for detecting optical channel bandwidth misalignment between output channels of a first optical device and input channels of a second optical device, the method comprising:
    generating optical signals each having a predetermined optical bandwidth;
    impressing a radio frequency (RF) signal component on at least a subplurality of said optical signals;
    transmitting said optical signals to said first optical device;
    using said first optical device to receive said optical signals and to subsequently transmit said optical signals from a plurality of optical output channels to said optical input channels of said second optical device, wherein each one of said optical signals is assigned to a specific one of said optical input channels;
    analyzing said RF signal components impressed on said optical signals being received by said second optical device to determine if any given one of said optical signals is being received in one of said input channels that said given optical signal should not be present in.

9. The method of claim 8, further comprising impressing RF signal components having different frequencies on selected ones of said optical signals.

10. The method of claim 8, further comprising impressing either RF analog signals or RF digital signals on selected ones of said optical signals.

11. The method of claim 8, further comprising monitoring a temperature of said first optical device in real time.

12. The method of claim 11, further comprising monitoring for a change in a magnitude of each of said optical signals received by said second optical device and, using said monitored temperature of said first device, determining a needed magnitude correction for each of said optical signals as a result of bandwidth misalignment between said output channels of said first optical device and said input channels of said second optical device.

13. A method for detecting optical channel bandwidth misalignment between output channels of a first optical device and input channels of a second optical device, caused by operating temperature differences between said first and second optical devices, the method comprising:
    generating optical signals each having a predetermined optical bandwidth;
    impressing a radio frequency (RF) signal on at least a subplurality of said optical signals;
    transmitting said optical signals to said first optical device via a first optical medium;
    using said first optical device to receive said optical signals and to subsequently transmit said optical signals from a plurality of optical output channels, over a second optical medium, to said optical input channels of said second optical device, wherein each one of said optical signals is assigned to a specific one of said optical input channels;
    analyzing said RF signals impressed on said optical signals being received by said second optical device to determine if any given one of said optical signals is being received in one of said input channels that said given optical signal should not be present in; and analyzing a magnitude of each of said optical signals received by said second optical device to determine if a magnitude correction is needed for each said signal.

14. The method of claim 13, wherein impressing an RF signal on each said optical signal comprises impressing an analog signal on selected ones of said optical signals.

15. The method of claim 13, wherein impressing an RF signal on each said optical signal comprises impressing a digital signal on selected ones of said optical signals.

16. The method of claim 13, further comprising monitoring a temperature of said second optical device and using said monitored temperature in determining a degree of said magnitude correction needed for each said optical signal.

* * * * *